May 8, 1945. B. E. SHERRILL 2,375,329
MAGNETIC COMPASS
Filed May 20, 1943 4 Sheets-Sheet 1
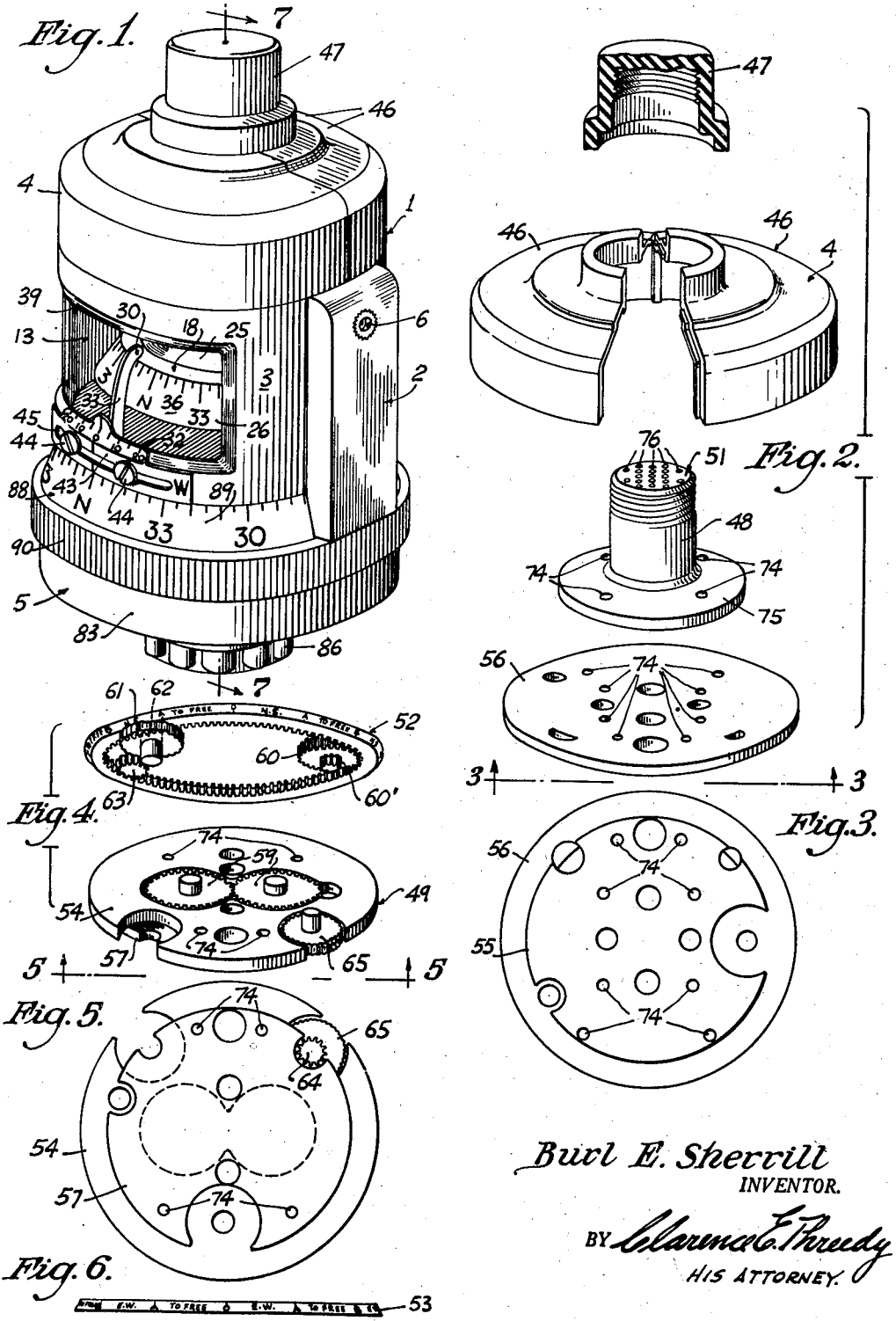
Burl E. Sherrill
INVENTOR.
BY Clarence E. Threedy
HIS ATTORNEY.

May 8, 1945.  B. E. SHERRILL  2,375,329
MAGNETIC COMPASS
Filed May 20, 1943  4 Sheets-Sheet 2

INVENTOR.
Burl E. Sherrill
BY Clarence E. Threedy
HIS ATTORNEY.

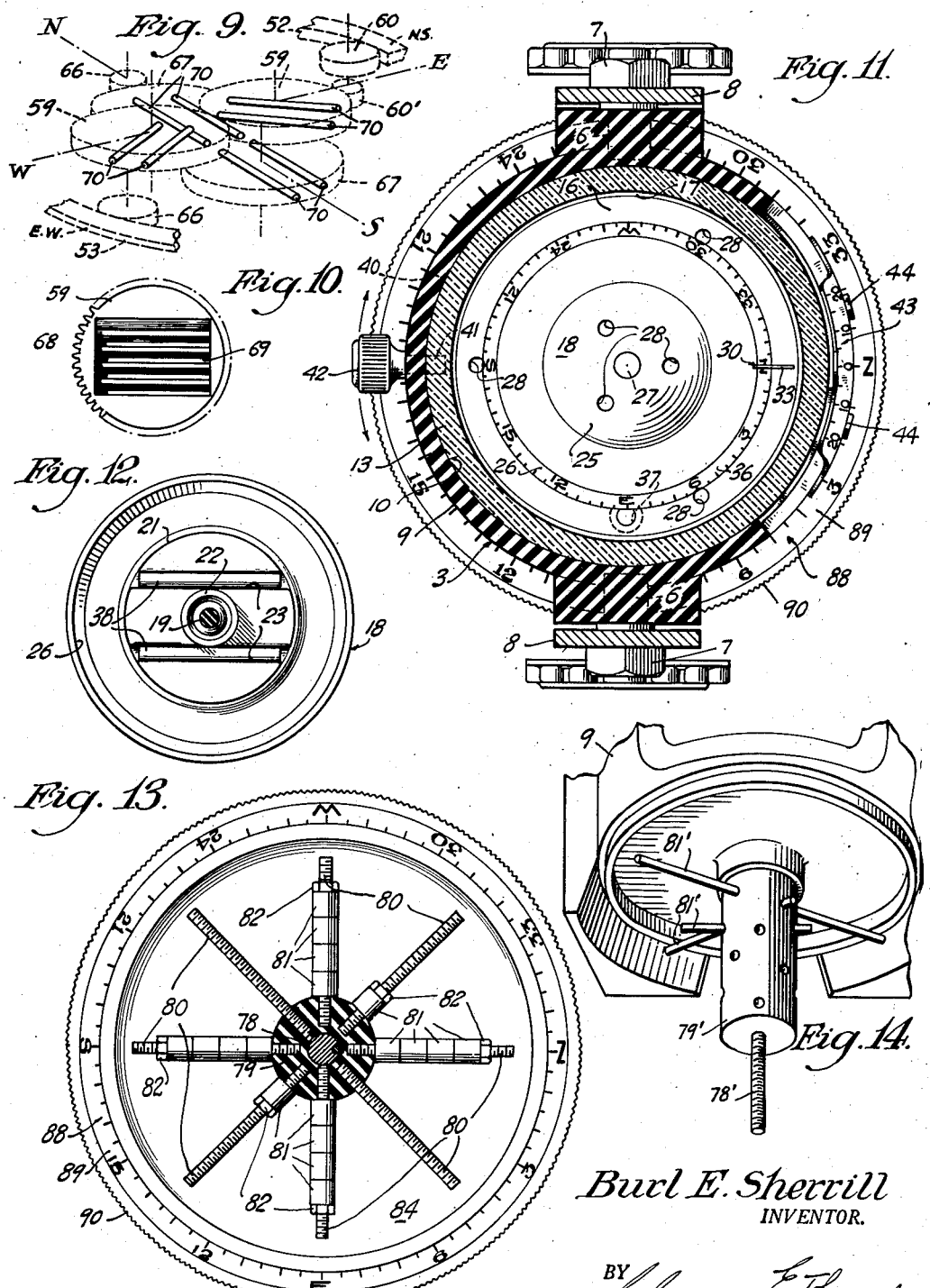

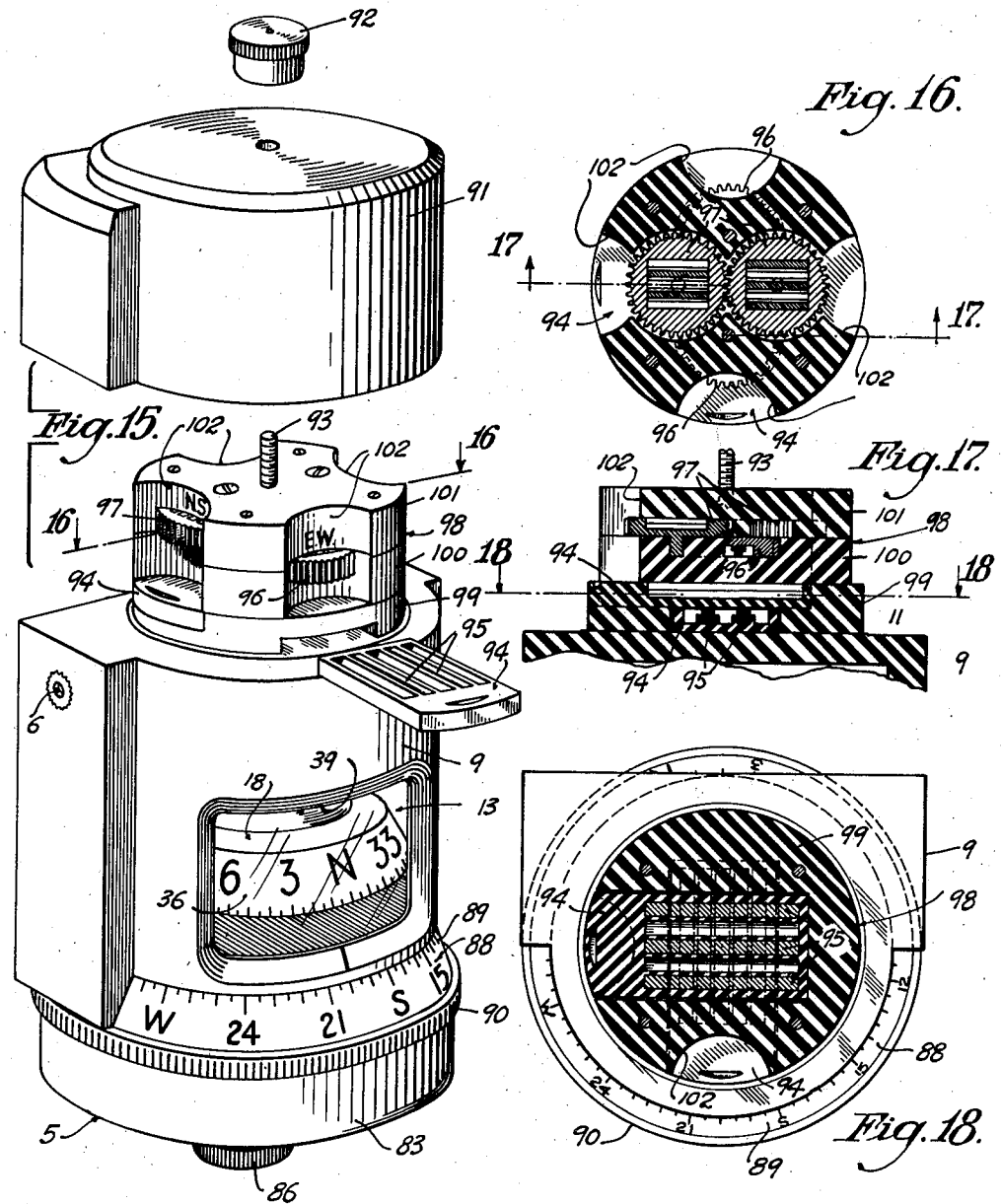

Patented May 8, 1945

2,375,329

UNITED STATES PATENT OFFICE 2,375,329

MAGNETIC COMPASS

Burl E. Sherrill, Peru, Ind.

Application May 20, 1943, Serial No. 487,721

8 Claims. (Cl. 33—225)

This invention relates to a magnetic compass and more particularly to improvements in a magnetic compass having as its principal object simple construction, facile assembly and economical manufacture.

Another object of this invention is to provide a composite compensator arrangement for a magnetic compass whereby to overcome the distracting effect of magnetically attractable objects and stabilize the magnetic compass relative to the particular vehicle with which it is associated.

Yet another object of my invention is to provide a compass rose rotatively movable in a fluid filled bowl with fractional buoyancy to increase the sensitivity of the responsive qualities of the magnetic bars it carries.

Still another object of my invention is to provide a movable compass bowl encasing a floating compass rose and a lubber line associated therewith in a manner to overcome a constant error in the compass relative to the casing.

A further object of this invention is to provide a simple, yet effective, means for affecting a heeling compensation for magnetic compasses.

A still further object of this invention is to provide a compact and interrelated arrangement of parts for accomplishing both preliminary and vernier adjustment of compensating bars in substantially closely spaced strata of horizontal planes relative to the actual magnetic compass.

Further still, it is an object of this invention to provide quadrantal mountings for compensating for deviations at diagonal points of the compass relative to the four major directional positions and equalize constant error on cardinal points.

Other objects will appear more fully hereinafter.

The invention consists in the novel combination and arrangement of parts to be hereinafter described and claimed.

The invention will be best understood by reference to the accompanying drawings showing my new compass arrangement, and in which:

Fig. 1 is a perspective view of my preferred form of compass structure;

Fig. 2 is an exploded perspective view of the head assembly;

Fig. 3 is a bottom plan view of a part employed in the head assembly as seen from line 3—3 in Fig. 2;

Fig. 4 is an exploded perspective view of the compensator assembly;

Fig. 5 is a bottom plan view of a part of the compensator as seen from below in Fig. 4 from line 5—5 thereof;

Fig. 6 is a side elevational view of an index ring associated with the compensator assembly;

Fig. 9 is a perspective diagram illustrating the principle employed in the compensator assembly;

Fig. 10 is a bottom plan view of a magnet carrier employed in the compensator assembly;

Fig. 11 is a horizontal sectional detail through my compass structure as seen from line 11—11 in Fig. 7;

Fig. 12 is a bottom plan view of the compass rose seen in Fig. 11;

Fig. 13 is a horizontal sectional detail through the lower portion of my compass structure substantially along line 13—13 in Fig. 7 and showing the quadrantal adjusting and compensating arrangement;

Fig. 14 is a perspective view of the underside of a compass case showing a modified form of quadrantal adjusting and compensating arrangement;

Fig. 15 is a perspective view of a modified form of compass case partly disassembled and disclosing a modified form of compensator assembly;

Fig. 16 is a horizontal sectional detail through the modified compensator assembly as seen along line 16—16 in Fig. 15;

Fig. 17 is a fragmentary vertical sectional detail view as seen from line 17—17 in Fig. 16; and Fig. 18 is a horizontal sectional detail view taken through certain drawer arrangement forming a part of my modified form of compensator assembly as seen substantially from line 18—18 in Fig. 17.

Figures 7, 8:
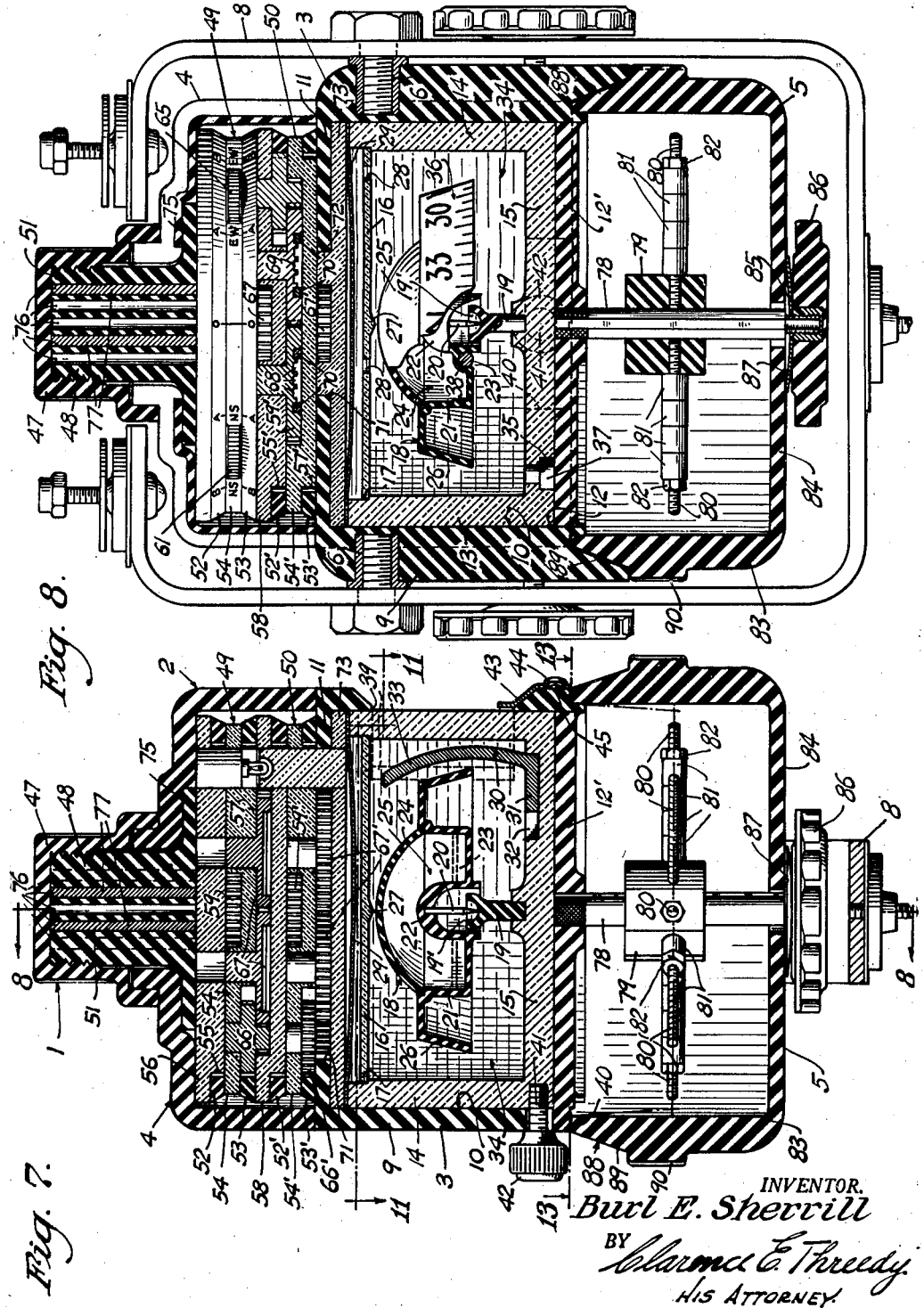
Fig. 7 is a vertical sectional detail through my compass structure as seen looking in the direction of line 7—7 in Fig. 1.
Fig. 8 is a vertical sectional detail through the compass structure as seen from line 8—8 in Fig. 7.

This invention contemplates the provision of a magnetic compass for use in the most rugged types of vehicles where the possibility of disturbing factors are extremely great. The conditions and surrounding circumstances which prevail in tanks employed in warfare have the most distracting effects on magnetic compasses and it is with these affects in mind that the present invention has been conceived.

The compass structure is generally indicated by the reference character 1 and comprises a composition casing 2 comprising a main section 3, a head assembly 4 and a lower portion 5. The main section 3 is provided with a pair of axially aligned bearings 6 horizontally disposed and providing a swinging support adapted to receive mounting bolts 7 at the sides of the main section which mounting bolts are in turn carried by a suitable mounting bracket 8 shown in part in Fig. 8.

*The main section*

The main section 3 consists of a cylindrical body 9 providing a chamber 10 having an upper wall 11 and an open bottom 12 adapted to receive a bowl 13 and a bottom panel 12' for suitably supporting the bowl 13 in the chamber 10. The bowl 13 is in frictional engagement with adjoining parts of the casing to prevent its movement unless intended as will be hereinafter explained.

The bowl 13 comprises a cylindrical cup 14 made of a transparent material such as a heavy thermal plastic and having a bottom wall 15 and an open end adapted to be closed by a baffle plate 16 which rests on a shoulder 17 formed on the inside face of the cup 14 a substantial distance below the upper edge of the cup 14. A compass rose 18 is disposed within the bowl 13 for rotative movement relative thereto on a bearing post 19 suitably supported on the bottom wall 15 and having a recessed upper end 19' adapted to receive and support a needle 20 extending downwardly from the rose 18.

The compass rose 18 consists of a plastic body 21 having a dome shaped center 22 with two parallel grooves 23 formed on the sides thereof to embrace the skirting of the dome. A pair of bar magnets 38 are pressed into the respective grooves 23 to render the compass rose sensitive to the influences of the earth's magnetic force. The balance of the body is recessed on its upper surface surrounding the dome 22 to form an open topped chamber 24 adapted to receive a segment of a sphere 25 to seal the chamber 24 relative to the interior of the bowl 13 for reasons presently to be explained. An annular skirting 26 extends laterally from the mid portion of the body 21 and carries a compass card 36' displaying rhumb lines of the compass.

The baffle plate 16 has a central detent 27 which lies closely adjacent the upper surface of the segment 25 in such a manner as to retain the point of the needle 20 within the recess 19' to prevent displacement of the compass rose therefrom. As will be seen in Figs. 8 and 11 the baffle plate 16 has a plurality of spaced apertures 28 which permit passage of fluid from the bowl 13 to the upper opening thereof which in turn is sealed by a resilient diaphragm 29.

The compass bowl 13 also provided with a lubber line 30 which is in the form of a piece of thin non-ferrous material having a base 31 adapted to be pressed into a slit 32 formed on the inside face of the bottom wall 15 and having an upstanding portion 33, arcuate in shape, to permit tiltability of the compass rose 18 and provide a fixed indicator line with respect to the rhumb points on the compass card 36.

The bowl 13 is filled with a suitable liquid 34 through an opening 35 formed in the bottom wall 15 and suitably sealed thereafter by a plug 37. The liquid 34 is intended to completely fill the cup 14, however, there is always a possibility of air bubbles forming in the bowl and for this reason the space between the baffle plate 16 and the diaphragm 29 is provided to impound such air bubbles above the actual compass bowl.

As is well known the liquid 34 stabilizes the movement of the compass rose relative to the bowl and eliminates normal vibrations of the compass card when the housing is jarred. In addition to this feature I have provided an air tight chamber 24 in the compass rose which chamber may have its air evacuated to form a vacuum therein. By reason of this construction the normal weight of the body 21 is decreased and the buoyancy of the compass rose increased in order to lighten the load of the compass rose on the point of the needle 20 thereby increasing the sensitivity of the compass reactions under the influence of polar fields.

The cylindrical body 9 has an opening 39 formed in the front face thereof through which opening 39 the bowl and compass rose may be viewed. The rear wall of the body 9 has a horizontal slot 40 formed therein through which extends a shank 41 of a knob 42 which is attached to the bowl 13 to provide a handle for the bowl whereby to facilitate manual rotation of the bowl 13 relative to the chamber 10 in the body 9. Under normal conditions the lubber line 30 is disposed centrally with respect to a vertical axis through the viewing opening 39 and an indexing plate 43 adjustably mounted on the front face of the body 9 by a pair of set screws 44 which pass through a horizontal slot 45 formed in the plate 43.

*The head assembly*

The compass 1 is provided with a compensator unit for overcoming deviations in readings on the compass relative to the magnetic compass directions. This compensator unit is completely housed in the head section 4 which is enclosed by a split body portion 46 held in position on the body 9 of the main section 3 by a screw cap 47 which is threadably connected to an upstanding post 48 forming a portion of the compensator now to be explained.

There are three principal phases of compensation accomplished by means confined in the head assembly of the compass structure, the first being a rough or preliminary semicircular correction hereinafter referred to as "freeing"; the second being a fine or vernier semicircular adjustment of certain supplemental bar magnets for the purpose of attaining as near a correct reading as is possible; and the third being a correction to overcome vertical magnetic influences which third form of correction is commonly called "heeling."

Turning now to the drawings, particularly Figs. 7 and 8, the freeing compensator is generally indicated at 49, the vernier at 50 and the heeling at 51. The freeing compensator 49 is well illustrated in Figs. 4 through 6 inclusive considered in view of Figs. 7 and 8, and as seen in the views referred to it is an object of my improved construction to dispose the compensating bar magnets in as closely spaced arrangement as is physically possible. In accomplishing this end, I provide a dual purpose unit 49 wherein both north and south compensation and east-west compensation are confined to a relatively small vertical space with a minimum number of working parts.

The compensator 49 consists of a pair of index rings 52 and 53 spaced from each other by a medial plate 54. The ring 52 indicates north-south adjustment and is suitably positioned on a reduced portion 55 of an upper plate 56 while the ring 53 indicates east-west adjustment and surrounds a reduced portion 57 on the medial plate 54 and lies on top of the peripheral flange of a dividing plate 58. The freeing compensation is in effect a semicircular compensation but is a preliminary form of such semicircular compensation, and for this reason both the freeing and semicircular compensators 49 and 50 respectively are structurally similar. Thus it will be seen that like parts are present in each of these units such as a pair of rings 52' and 53' spaced from each other by a medial plate 54', the ring 52' surrounding a reduced portion 55' on the dividing plate 58 while the ring 53' surrounds the reduced portion 57' on the medial plate 54'. The lowermost ring 53' rests on the top 11 of the casing 9, as does the reduced portion 57', in such a manner as to provide sufficient clearance to permit free rotation of the ring 53' about the portion 57'.

The medial plate 54 is recessed as shown in Fig. 4 to receive horizontally disposed magnet carrying gears 59 meshing with each other and drivingly connected to a pinion gear 60' formed as a part of a transmission gear 60 engaging with the inner gear face of the index ring 52. The medial plate 54 is also recessed at oblique points on its front face (see also Fig. 8) to receive a knurled thumb operated control wheel 61 which has a pinion thereof journaled in a bearing formed in the reduced portion 57 of the medial plate and also has a gear pinion 62 engageable with the inner gear face of the index ring 52 whereby to rotate the latter about the reduced portion 57 to transmit rotative movement to the gears 59 through the gear 60. A floating gear 63 is suitably journaled in the upper plate 56 and at a point relative to the control wheel 61 and the transmission gear 60 as to assure the disposal of the ring 52 concentrically with respect to the reduced portion 57. As seen in Figs. 4 and 3 all three of these gears, namely the pinion gear 62, the transmission gear 60 and the floating gear 63 are disposed in a respective recess formed in the reduced portion 55 of the upper plate 56 similar recesses being formed in substantially similar locations on the reduced portion 57 of the medial plate 54 as shown in Fig. 5.

The ring 53 is disposed on the reduced shoulder 57 and has its inner gear face in mesh with the pinion 64 of a control wheel 65 also disposed in the medial plate 54. The inner gear face of the ring 53 in turn meshes with a transmission gear 66 to transmit rotative movement into a pair of magnet carrying gears 67 similar to the gears 59 but disposed at right angles with respect thereto. These gears 67 and the pinion gear thereof are lodged in a recess formed in the top surface of the dividing plate 58 and similar in relation with respect to each other as is the case of the recesses formed in the upper face of the medial plate 54. Thus the freeing unit 49 has both a north-south adjustment and an east-west adjustment in a minimum vertical heighth. The semi-circular compensator 50 being similar in character like reference numerals with an exponent or prime character thereafter indicate like parts.

The magnet carrying gears 59, 67, 59' and 67' are constructed as best illustrated in Fig. 10 with a plurality of parallelly arranged pockets 68 formed in their bottom face with a central pocket 69 arranged along a diametrical axis of the gear and symmetrically spaced pockets on the sides thereof. These pockets 68 are adapted to receive magnetic bars 70 in quantities, the number being determined by the particular distracting magnetic force of induction to be overcome. As shown in Fig. 9 these pockets 18 are so formed as to dispose the magnetic bars 70 in perfect axial alignment with respect to each other and so that they can be simultaneously adjusted in equal and opposite angular directions with respect to a plane through the axis of the compass rose.

The upper wall 11 of the casing 9 in the main section has an oval shaped opening 71 formed therein to receive a portion 72 of a mounting plate 73 which is inserted up through the open bottom 12 of the case 9. The portion 72 has a pair of tangential recesses formed therein to receive the lowermost magnet carrying gears 67 and at diagonal points has bolt holes 74 aligned with like holes 74 in each of the superimposed plates 54', 58, 54 and 56 to permit mounting screws (not shown) to extend upwardly therethrough for binding relation with the flange 75 on the upstanding post 48.

This upstanding post 48 has a plurality of vertically arranged passages 76 formed therein for the purpose of receiving bar magnets to support them vertically above the compass rose in close proximity to the vertical axis thereof. This structure comprises the heeling compensator heretofore mentioned and includes a series of bar magnets 77 as shown in Figs. 7 and 8 to vary the magnetic influence to be applied in "heeling" the magnetic compass.

Having thus described my improved arrangement for compensating by permanent magnetism I now refer to the lower portion 5 of my new compass structure.

*Lower portion and quadrantal*

As hereinbefore explained the open bottom 12 of the casing 9 has a bottom panel 12' disposed therein to support the bowl 13. This panel 12' has its peripheral edges attached to the inner walls of the casing 9 by any suitable method and has depending from its central boss, coaxially with respect to the compass rose, a keyed shaft 78 adapted to support a nonconductive collar 79 at various points of adjustment relative to the bottom of the compass bowl. This collar 79 carries a plurality of radially extending arms 80, more particularly four, disposed fore, aft, port and starboard, and four others at diagonal points, making in all eight of such arms. The arms 80, being considered in sets of four, are quadrantal correctors, one quadrantal corrector being employed to effect a compass correction to the four cardinal points on the compass and the other to effect compass correction at mid cardinal points on the compass. The collar 79 is keyed to the shaft 78 in order to maintain the various arms 80 at the desired angles of radial projection, but may be moved vertically to any desired position relative to the compass rose.

The arms 80 serve to support metal collars 81 in limited numbers as is best illustrated in Fig. 13. These washers are made preferably of a metal known in the art as "Permalloy" which has a relatively low capacity as to the retention of magnetism (highly permeable with hysteresis curve accordingly). These collars 81 serve as compass correctors by neutralizing the effects of the vehicle's magnetism. Each of the arms 80 are threaded and receive a nut 82 for the purpose of securing collars 81 in series in fixed position on the arms 80.

The quadrantal compass corrector is enclosed by a cover 83 having an opening formed in its bottom wall 84 to permit the threaded end 85 of the shaft 78 to extend therethrough for the reception of a knob 86. A friction disc 87 is disposed between the knob 86 and the bottom wall 84 of the cover 83 whereby to secure the latter in place on the casing 9 and yet permit rotative movement of the cover 83 relative to the casing 9. The cover 83 in addition to serving as an enclosure for the quadrantals, as hereinbefore explained, is also a course indicator 88 for the compass structure. To this end the upper end of the cover 83 has a beveled surface 89 on which is inscribed rhumb lines similar to those on the compass card 36. The cover 83 also has an annular projection 90 which serves as a finger engaging surface whereby to manually rotate the course indicator 88 to a desired angular direction it is desired that the vehicle shall travel and hence when the rhumb lines of compass card 36 coincide with those of the course indicator the vehicle will be facing in the desired direction of travel.

*Operation*

In use the compass structure is installed in the vehicle with which it is to be associated, the bracket 8 being properly bolted on the body of the vehicle. The compass structure is then stripped of all auxiliary metals such as the bar magnets 77 in the heeling assembly as well as the permalloy collars on the quadrantals. The freeing and vernier magnet carrying gears 59—67—59' and 67' are positioned in alignment with their respective bar magnets 70 neutralized with the corresponding bar magnet on the opposite gear. The vehicle is then faced due north with motor running and other gear in a normal condition for traveling of the vehicle, and the reading on the compass card taken. This is repeated for each of the other cardinal points of the compass. By mathematical formula the deviations in reading are used to calculate the amount of compensation necessary to overcome the error at the various points of the compass, the freeing gears 59 and the control wheels 61 and 65 thereof rotated to simultaneously adjust the gears 59—67 to dispose their respective magnets 70 in equal and opposite angular directions relative to each respective set of gears.

Having thus freed the magnetic compass from the general influences of magnetic bodies within the vehicle the foregoing procedure is repeated with respect to the vernier semicircular compensator 50 in an effort to eliminate any error in reading completely.

The next step is to make a heeling adjustment which is accomplished by tilting the vehicle approximately 10° with respect to the vertical with the vehicle facing due north. It is desirable that the compass reading be the same when the vehicle is in tilted and level position and to this end bar magnets 77 of necessary number are dropped into the desired passages 76 until the readings are identical or as close thereto as to permit only of a fractional error.

The compass is now fairly near correct in its indication. However, influences of the earth's magnetic field relative to certain ferrous parts of the vehicle may yet be overcome by employing the quadrantal compass corrector. In this regard the vehicle must against be tested in each of the four cardinal positions of the compass by facing the vehicle in each test in one of such major directions N. S. E. and W. Permalloy collars 81 are then added to the diagonally disposed arms 80 to compensate for deviations in readings on the compass card relative to the true direction in which the vehicle is facing until the error is equalized on the two planes. The vehicle is then tested while facing consecutively in each of the diagonal directions (45°, 135°, 225° and 315° respectively) and permalloy collars added to the arms 80 extending longitudinally and laterally (crosswise) with respect to the long axis of the vehicle, thus cutting down any error in reading on the compass card.

Should the reading on the compass card be slightly out of line with respect to the lubber line 30 when the vehicle is facing in a true north direction, for example, the entire bowl 13 may be rotated relative to the casing 9 by manipulation of the knob 42, thus bringing the lubber line in perfect alignment with the particular directional rhumb line on the card 36. Completing this last adjustment it is essential that the zero indicia on the indexing plate 43 on the front wall of the casing 9 be in perfect alignment with the lubber line 30 and hence it must be shifted.

After the compass structure is once installed in a vehicle and tested in the manner hereinbefore set forth, periodical tests must be made to at all times assure a proper reading of the compass. Such periodical tests, however, are not as detailed as an original test, it being necessary only to manipulate the control wheels 61 or 65 and 61' or 65' and other minor manipulations of surrounding compensators.

*Modifications*

A modified form of quadrantal compass corrector is shown in Fig. 14 which illustrates the bottom section of a casing 9 having a depending shaft 78' which has holes drilled across its length to receive bars 81' of permalloy material to overcome the influence of surrounding metallic bodies in the same manner as do the collars 81. There are two sets of such holes in the shaft 78' consisting of four holes each. These holes are spaced from each other along the axis of the shaft 78' and are staggered as seen in Fig. 14 so as not to interfere with each other. A rubber collar or other frictional means 79' is mounted on the shaft 78' and has holes formed therein in alignment with the holes in the shaft 78' and serves to frictionally grip the inserted bars 81' to maintain them in the desired position of adjustment. As will be noted in Fig. 14, the bars 81' are varied in length, they being selected according to the need for greater or lesser quantities of metal in order to arrive at the ideal adjustment of the compass rose. It is also pertinent to note that the two vertically disposed sets of holes enable the insertion of bars 81' at varied distances relative to the compass rose. It is also important to note that the bars 81' may extend more to one side than the other of the shaft 78', thus presenting an off-center quantity of metal much in the same manner as the collars 81 shown in Fig. 13. However, symmetrical positioning should be considered preferable.

A modified form of semicircular compensator is shown in Figs. 15 through 18 in which like parts have like reference numerals with respect to those used in explaining the preferred form of compass structure. In this modified form of construction a cover 91 is provided for the head assembly which cover 91 is normally disposed on the top of the casing 9 and held thereon by a thumb nut 92 and stud screw 93 the latter of which extends upwardly from the head assembly.

In this form of compensator the freeing compensation is accomplished by drawer type magnet carriers indicated at 94. In this form of freeing compensator the bar magnets 95 are reduced or increased in number to suit the particular circumstance and are otherwise static relative to the compass rose. The vernier adjustment of semicircular compensation is accomplished by providing a pair of magnet carrying gears 96 disposed in a plane parallel to the fore and aft axis of the vehicle and a pair of like gears 97 disposed crosswise with respect to the aforesaid axis. The body 98 of the head assembly is made in three sections the lower one 99 having crosswise slots formed therein, one above the other, to receive the drawers 94. The remaining two sections 100—101 of the body 98 cover the lower section 99 and have their abutting faces recessed to receive the gears 96—97, the lower set being disposed in the lower section 100 and the upper set in the top section 101 with the two sets of gears rotatable adjacent each other.

The body 98 has vertical grooves 102 formed therein at the front and back as well as at the two sides to expose the periphery of the gear sets 96 and 97 whereby they may be manipulated to swing the bar magnets 95 carried thereby into desired positions of adjustment.

Having thus described my new compass structure it is apparent that I have provided a compact unit of relative simple construction employing a minimum number of working parts. The advantage of this structure over other known types of magnetic compasses is found in the fact that there are less parts rendering the device easy to assemble and permitting the arrangement of compensator means relatively close to the compass rose and requiring but little additional height in the compass structure.

While I have illustrated and described the preferred form of construction for carrying my invention into effect, this is capable of variation and modification without departing from the invention. I, therefore, do not wish to be limited to the precise details of construction set forth, but desire to avail myself of such variations and modification as come within the scope of the appended claims.

Having thus described my invention, what I claim as new and desire to protect by Letters Patent is:

1. A compass structure including a casing having a main section and a head assembly, a compass bowl arranged in said main section, a compass rose arranged in said bowl, a pair of semicircular compensators arranged above said main section and in said head assembly and comprising a series of superimposed plates, magnet-carrying gears in mesh for horizontal rotation carried by said plates, an upstanding post arranged on said superimposed plates and having a plurality of vertically disposed passages formed therein to receive a predetermined number of bar magnets calculated to overcome induced magnetism emanating from the vehicle in which the compass structure is installed, means for securing said superimposed plates and said upstanding post to said main section, cover means for enclosing said head assembly, and cap means threadably arranged on said upstanding post and securing said cover means on said main section.

2. A compass structure including a casing having a main section and a lower portion, a compass bowl arranged in said main section, a compass rose arranged in said bowl, a pair of semicircular compensators arranged above said main section and in said head assembly and comprising a series of superimposed plates, magnet-carrying gears in mesh for horizontal rotation carried by said plates, an upstanding post arranged on said superimposed plates and having a plurality of vertically disposed passages formed therein to receive a predetermined number of bar magnets calculated to overcome induced magnetism emanating from the vehicle in which the compass structure is installed, means for securing said superimposed plates and said upstanding post to said main section, cover means for enclosing said head assembly, cap means threadably arranged on said upstanding post and securing said cover means on said main section, a compass corrector on said lower portion and including a depending shaft, a plurality of radially extending arms adapted to receive ferrous elements to neutralize the effects of surrounding magnetic bodies, a course indicator for said compass and for enclosing said compass corrector, and means securing said course indicator for rotative movement on said depending shaft with the rhumb lines of said course indicator disposed in close proximity to said compass rose.

3. In a magnetic compass structure including a housing, a compass card arranged in said housing, a semicircular compensator comprising, in combination, a pair of gears for supporting bar magnets diametrically thereof and arranged in the upper wall of the housing for horizontal intermeshing relation, a transmission gear engaging one of said gears, an annular ring having an internal gear face engaging said transmission gear, a plate member having a reduced portion arranged within said annular ring, and control means journaled in said plate member and having a gear pinion in mesh with said internal gear face, said control means protruding exteriorly of said plate member for manual operation to rotate said annular ring and said pair of gears to simultaneously adjust bar magnets carried thereby in equal opposite angular directions with respect to said compass card.

4. A semicircular compensator for a magnetic compass and comprising a head plate having a reduced portion on its lower face, an annular ring arranged to surround said reduced portion and having an internal gear face, a medial plate arranged beneath said annular ring and having a recess formed therein, a pair of magnet carrying gears arranged in said recess for rotative movement, means linking said magnet carrying gears with the internal gear face on said annular ring, an offset recess formed in said medial plate and exposed through the periphery of the latter, control means disposed in the offset recess in said medial plate for manual operation and having a pinion in mesh with said annular ring whereby to facilitate adjustment of said magnet carrying gears relative to the compass structure.

5. A compensator head assembly for a compass structure including a compass housing having a horizontal recess formed therein, magnet carrying gears supported in said recess for intermeshing relation, an indexing ring arranged concentrically on said housing, means for transmitting motion from said indexing ring to said magnet carrying gears, a medial plate arranged on said indexing ring and having a reduced portion depending therefrom and disposed within said indexing ring to support the latter for concentrical rotation on said housing, and means for simultaneously rotating said indexing ring and said magnet carrying gears.

6. A head assembly for a compass structure including a compass housing, in combination, a freeing compensator and a vernier compensator, said compensators arranged in a series of narrow plates superimposed one above the other, each of said compensators including a base plate having tangentially disposed circular recesses formed therein, a pair of gears supported in said recesses for intermeshing relation and having diametrically disposed pockets formed therein to support magnetically attractable bars, an indexing ring having an internal gear face arranged concentrically on said base plate, a medial plate arranged on said indexing ring, a spacer plate arranged within said indexing ring to space the medial plate from said base plate to permit rotation of said indexing ring, bearing means formed in said base and spacer plates, transmission means in said bearing means for linking one of said gears with said internal gear face, and control means journaled in said spacer and medial plates and protruding exteriorly of the peripheral edge of said medial plate and having means linked to said internal gear face for rotating the indexing ring and pair of gears, said medial plate having tangential circular recesses disposed therein at right angle with respect to the recesses formed in said base plate, a pair of magnet carrying gears supported in the recesses of the medial plate, a second indexing ring arranged on said medial plate, a head plate forming a base plate for the upper compensator unit and disposed above said second indexing ring and having a depending reduced portion disposed within said indexing ring, a second control means journaled in said reduced portion and said medial plate and linked to said second indexing plate to rotate the latter, and means journaled in said head plate and said medial plate for transmitting rotative movement to said pair of magnet carrying gears supported in said medial plate.

7. A heeling compensator for a magnetic compass structure and including an upstanding post concentrically arranged on said compass structure, there being a plurality of vertically disposed passages formed in said upstanding post and adapted to receive magnetized bars calculated to neutralize the effects of vertical magnetic fields adjacent said compass structure.

8. A heeling compensator for a magnetic compass structure including a housing and a compass rose, a plurality of vertically disposed pockets formed in said housing above said compass rose in close proximity to the vertical axis thereof, and a plurality of permanent magnet bars selected for disposal in said passages for overcoming the influences of vertical magnetic fields created by adjacent bodies in the vehicle with which the compass structure is associated.

BURL E. SHERRILL.